(12) United States Patent
Ukita et al.

(10) Patent No.: US 11,780,397 B2
(45) Date of Patent: Oct. 10, 2023

(54) AIRBAG DEVICE

(71) Applicant: Daicel Corporation, Osaka (JP)

(72) Inventors: Shinichiro Ukita, Tokyo (JP); Kenji Fukumoto, Tokyo (JP); Tomoki Hashizume, Tokyo (JP); Masayuki Yamazaki, Tokyo (JP); Nobuyuki Katsuda, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 17/778,444

(22) PCT Filed: Oct. 16, 2020

(86) PCT No.: PCT/JP2020/039177
§ 371 (c)(1),
(2) Date: May 20, 2022

(87) PCT Pub. No.: WO2021/100382
PCT Pub. Date: May 27, 2021

(65) Prior Publication Data
US 2023/0001875 A1 Jan. 5, 2023

(30) Foreign Application Priority Data
Nov. 22, 2019 (JP) ................................ 2019-211628

(51) Int. Cl.
*B60R 21/207* (2006.01)
*B60R 21/261* (2011.01)
*B60R 21/276* (2006.01)

(52) U.S. Cl.
CPC .......... *B60R 21/207* (2013.01); *B60R 21/261* (2013.01); *B60R 21/276* (2013.01)

(58) Field of Classification Search
CPC .... B60R 21/207; B60R 21/261; B60R 21/276
See application file for complete search history.

(56) References Cited

U.S. PATENT DOCUMENTS 5,947,514 A * 9/1999 Keller ................... B60R 21/207
280/736
6,425,602 B1 * 7/2002 Al-Amin ............. B60R 22/1951
280/730.2

(Continued)

FOREIGN PATENT DOCUMENTS

JP 49-7790 Y 2/1974
JP 09-136595 A 5/1997

(Continued)

OTHER PUBLICATIONS

International Search Report dated Dec. 22, 2020, issued in International Application No. PCT/.

(Continued)

*Primary Examiner* — Faye M Fleming
(74) *Attorney, Agent, or Firm* — XSENSUS LLP (57) ABSTRACT

The airbag device protects the occupant seated in the vehicle seat disposed in the vehicle. An airbag device includes a first airbag group and a second airbag group that are disposed in the vehicle seat in correspondence with impacts from two different directions and that respectively include a plurality of airbags; a gas generation unit that is disposed in a seat cushion, of the vehicle seat, that supports the buttocks region of the occupant and that generates gas to be supplied to the first airbag group or the second airbag group; and a switching unit that switches the supply of gas to either the first airbag group or the second airbag group.

15 Claims, 5 Drawing Sheets

(56) References Cited

U.S. PATENT DOCUMENTS

| | | | |
|---|---|---|---|
| 7,413,220 B2 * | 8/2008 | Itoga | B60R 22/1952 |
| | | | 280/741 |
| 2005/0189752 A1 | 9/2005 | Yasou et al. | |
| 2022/0410833 A1 * | 12/2022 | Ukita | B60R 21/207 |
| 2023/0099992 A1 * | 3/2023 | Fukumoto | B60R 21/207 |
| | | | 280/728.1 |

FOREIGN PATENT DOCUMENTS

| | | |
|---|---|---|
| JP | 2005-239129 A | 9/2005 |
| JP | 2006-143045 A | 6/2006 |
| JP | 2007-050835 A | 3/2007 |
| JP | 2008-201298 A | 9/2008 |

OTHER PUBLICATIONS

Written Opinion dated Dec. 22, 2020, issued in International Application No.

* cited by examiner

AIRBAG DEVICE

CROSS-REFERENCE TO RELATED APPLICATIONS

The present application is based on PCT filing PCT/JP2020/039177, filed Oct. 16, 2020, which claims priority to Japanese Patent Application No. 2019-211628, filed on Nov. 22, 2019, the entire contents of each are incorporated herein by reference.

TECHNICAL FIELD

The present disclosure relates to an airbag device mounted on a vehicle seat.

BACKGROUND ART

Techniques for protecting the occupant of a vehicle are known. For example, Patent Document 1 describes a vehicle side airbag device in which a waist bag deployed between a vehicle door and the waist of an occupant, a chest bag deployed between the vehicle door and the chest of the occupant, and an inflator that supplies gas to the waist bag and the chest bag are mounted on the vehicle seat. This vehicle side airbag device operates the inflator to provide gas to the waist bag and the chest bag, and deploys the waist bag and the chest bag at the time of a side collision of the vehicle or at the time of predicting a side collision.

CITATION LIST

Patent Document

Patent Document 1: JP 2008-201298

SUMMARY OF INVENTION

Technical Problem

In a vehicle, for example, impact from two different directions may occur, such as a side collision or a front collision. However, for example, the vehicle side airbag device described in Patent Document 1 responds only to impact from the side direction, and thus the occupant cannot be protected when impact occurs from a direction other than the side.

Furthermore, in order to increase the space inside the vehicle, there is a demand to thin the vehicle seat and to dispose the airbag device in the vehicle seat. However, the technology for thinning the vehicle seat while also mounting the airbag device in the vehicle seat has not been proposed.

The present disclosure has been conceived in view of the circumstances described above, and an object thereof is to provide an airbag device capable of protecting an occupant while making the vehicle seat thinner.

Solution to Problem

In order to solve the above-described problems, an airbag device of the present disclosure adopts a configuration including a switching unit that switches supply of gas to either a first airbag group or a second airbag group disposed in a vehicle seat. With such a configuration, the airbag device makes it possible for the vehicle seat to be made thinner while also deploying an airbag requiring deployment to protect an occupant.

Specifically, the present disclosure relates to an airbag device that protects an occupant seated in a vehicle seat disposed in a vehicle, the airbag device including a first airbag group and a second airbag group disposed in the vehicle seat in correspondence with impacts from two different directions, the first airbag group and the second airbag group each including a plurality of airbags; a gas generation unit disposed in a seat cushion, of the vehicle seat, that supports a buttocks region of the occupant, the gas generation unit generating a gas to be supplied to the first airbag group or the second airbag group; and a switching unit that switches supply of the gas to either the first airbag group or the second airbag group.

An airbag device of the present disclosure includes a first airbag group and a second airbag group disposed in a vehicle seat, and a gas generation unit and a switching unit disposed in a seat cushion. The airbag device protects the occupant by deploying an airbag included in the first airbag group against an impact from one direction. Furthermore, the airbag device protects the occupant by deploying an airbag included in the second airbag group against an impact from other directions different from the one direction. Thus, the airbag device can protect the occupant against impacts from two different directions. In addition, the airbag device merely needs to deploy the airbag necessary for occupant protection according to the direction of the impact, and thus each airbag merely needs to have a volume of an extent the occupant can be protected from the impact in one direction, a portion to protect in the occupant is assigned by a plurality of airbags, and the volume of each airbag can be reduced. Furthermore, the airbag device can reduce the volume of each airbag, making it possible to reduce the amount of gas required for the deployment of the airbag, and to also miniaturize the gas generation unit. As a result, the airbag device makes it possible for the vehicle seat on which each airbag and gas generation unit are mounted to be made thinner. As described above, the airbag device can protect the occupant while making the vehicle seat thinner.

In the airbag device described above, the first airbag group may be disposed in a seat back, of the vehicle seat, that supports the back of the occupant, and at least one of the plurality of airbags constituting the second airbag group may be disposed in the seat cushion. According to the airbag device having such a configuration, by folding the plurality of airbags included in the first airbag group to reduce the bulk and disposing the airbags in the seat back, the seat back can be thinned.

In the airbag device described above, the gas generation unit may be constituted of one gas generator, the airbag device may further include a main gas path connecting the gas generation unit and the switching unit, a first gas path connecting the switching unit and the first airbag group, and a second gas path connecting the switching unit and the second airbag group, and the plurality of airbags included in either one of the first airbag group or the second airbag group may be connected to at least either one of the first gas path or the second gas path, in series at different distances from the switching unit. According to the airbag device having such a configuration, the deployment order of the plurality of airbags can be set for occupant protection. Thus, the airbag device can protect the occupant.

In the airbag device described above, the switching unit may be a pyro-type valve disposed in the seat cushion. The pyro-type valve is operable only by the ignition current of an explosive, and can be used as a valve for switching the gas flow path.

In the airbag device described above, the plurality of airbags included in the first airbag group and the plurality of airbags included in the second airbag group may differ in total volume, and a valve may be disposed in the first gas path or the second gas path connecting one, of the first airbag group and the second airbag group, having a smaller total volume, and the switching unit, the valve communicating an inside of the path and an outside thereof when the inside of the path becomes greater than or equal to a predetermined pressure. In a case where gas is supplied to either the first airbag group or the second airbag group with one gas generator, the gas generator is set with the supply amount of gas (the generated amount of gas) in accordance with the airbag group having a larger total volume. Thus, when gas is supplied to the airbag group having a smaller total volume from the gas generator, it is not preferable as load is applied to each airbag included in the relevant airbag group. Thus, the load on each airbag can be reduced by providing, on either one of the gas paths, the valve that discharges excessive gas to the outside when the inside of the path becomes greater than or equal to a predetermined pressure.

In the airbag device described above, an impact from one direction, of the impacts from the two directions, may occur due to a side collision of the vehicle, the first airbag group may include a first side airbag that deploys in an occurrence side of the side collision, and a second side airbag that deploys in a side opposite to the occurrence side, the first airbag group may have a smaller total volume than the second airbag group, and the first gas path may have a larger cross-sectional area than the second gas path. In the airbag device having such a configuration, the first side airbag is deployed in the occurrence side of the side collision, and the second side airbag is deployed in the side opposite to the occurrence side. The total volume of the plurality of airbags included in the first airbag group is smaller than the total volume of the plurality of airbags included in the second airbag group. Since the volume of gas supplied from the gas generation unit cannot be changed for the cases in which the first airbag group is deployed and in which the second airbag group is deployed, the total volume of the first airbag group is made smaller than the total volume of the second airbag group, and thus the first side airbag can be deployed in a shorter period of time than airbags of the second airbag group. In addition, the first gas path can increase the flow rate of gas per unit time by increasing the cross-sectional area than the second gas path, and thus a large amount of gas can be supplied in a short period of time, and each airbag included in the first airbag group can be deployed in a relatively short period of time. Note that the cross-sectional area here is the area of the cross section in a direction orthogonal to the flow direction of the gas.

Here, in the airbag device described above, the gas generation unit may be configured to include a first gas generator and a second gas generator, the switching unit may be a control unit configured to independently operate the first gas generator or the second gas generator based on information indicating that impact from either one of the two directions has been received, the airbag device may further include a first gas path connecting the first gas generator and the first airbag group and a second gas path connecting the second gas generator and the second airbag group, and the plurality of airbags included in either one of the first airbag group or the second airbag group may be connected to at least one of the first gas path or the second gas path, in series at different distances from the first gas generator or the second gas generator.

As in the configuration, the airbag device may include two gas generators. As a result, the airbag device can deploy both the first airbag group and the second airbag group when the vehicle is subjected to impact from both directions of the two different directions, and thus the occupant can be protected even when the vehicle is subjected to impact from both directions.

In the airbag device described above, an impact from one direction, of the impacts from the two directions, may occur due to a side collision of the vehicle, the first airbag group may include a first side airbag that deploys in an occurrence side of the side collision, and a second side airbag that deploys in a side opposite to the occurrence side, a total volume of the plurality of airbags included in the first airbag group may be smaller than a total volume of the plurality of airbags included in the second airbag group, the first gas path may have a larger cross-sectional area than the second gas path, and a volume of the gas to be generated may be smaller in the first gas generator than in the second gas generator. According to the airbag device having such a configuration, each airbag included in the first airbag group can be deployed in a relatively short period of time than each airbag included in the second airbag group, and the occupant can be protected.

Advantageous Effects of Invention

According to the technology of the present disclosure, it is possible to protect the occupant while making the vehicle seat thinner.

DESCRIPTION OF EMBODIMENTS

Embodiments of an airbag device according to the present disclosure will be described below with reference to the drawings. Note that each of the configurations, combinations thereof, and the like in each embodiment is an example, and additions, omissions, substitutions, and other changes of the configuration may be made as appropriate without departing from the spirit of the present invention. The present disclosure is not limited by the embodiments and is limited only by the claims.

First Embodiment

Figure 1:
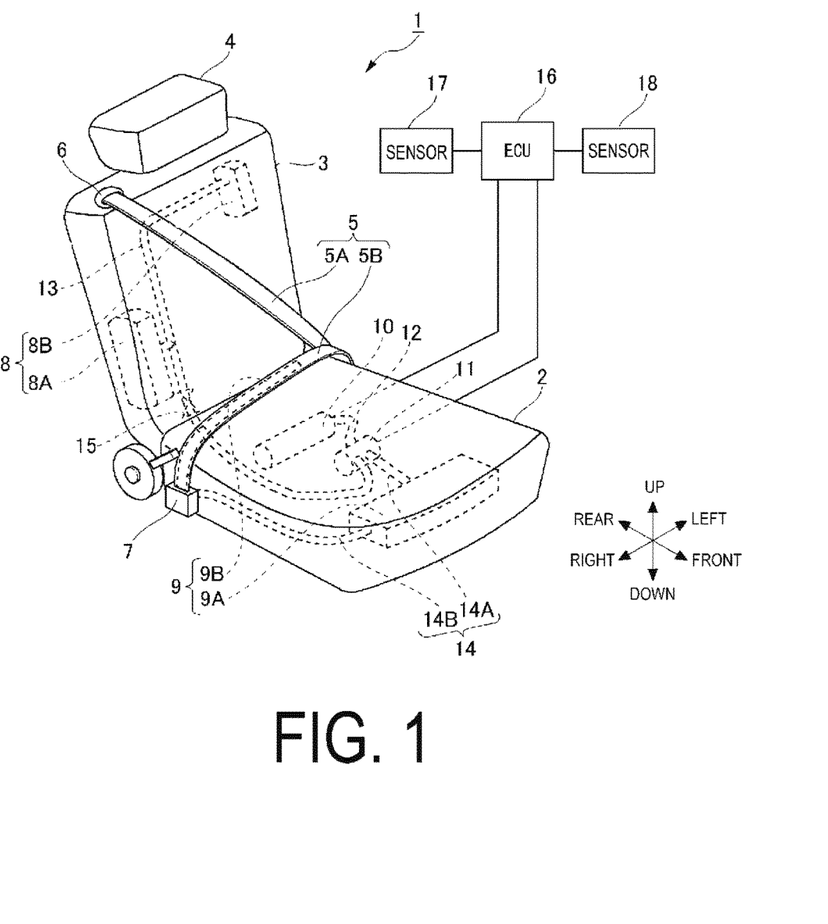
FIG. 1 is an outer appearance perspective view of a vehicle seat on which an airbag device according to a first embodiment is disposed.

FIG. 1 is an outer appearance perspective view of a vehicle seat 1 on which an airbag device according to the present embodiment is mounted. Note that, in the present specification, each direction in the front-rear direction (depth direction), the left-right direction (width direction), and the up-down direction (height direction) of the vehicle seat 1 will be described with reference to each direction of front-rear, left-right, and up-down directions, viewed from an occupant (seated person) seated in the vehicle seat 1.

The vehicle seat 1 is a seat on which an occupant of the vehicle sits. The vehicle seat 1 includes a seat cushion 2 that supports the buttocks region of an occupant, and a seat back 3 that supports the back of the occupant. The seat back 3 is connected to the seat cushion 2 and is inclinable with respect to the seat cushion 2. The vehicle seat 1 is attached to an upper end portion of the seat back 3 and includes a headrest 4 that supports the head of the occupant. Note that the headrest 4 may be integrally formed with the seat back 3, may be fixed to the seat back 3, or may be detachable from the seat back 3.

The vehicle seat 1 also includes a seatbelt 5 that restricts the occupant with respect to the vehicle seat 1. The seatbelt 5 has a shoulder belt 5A that extends from the right shoulder to the lower left abdomen of the occupant to restrain the upper body of the occupant; and a lap belt 5B that extends from the lower right abdomen to the lower left abdomen of the occupant to restrain the lower abdomen of the occupant. The vehicle seat 1 also includes a retractor 6 secured to the upper right portion of the seat back 3. The retractor 6 winds and houses the seatbelt 5 when the seatbelt 5 is not in use. Furthermore, the vehicle seat 1 includes a fixing portion 7 that is fixed to the right side part of the seat cushion 2 and fixes a terminal end of the lap belt 5B with respect to the vehicle seat 1; an anchor portion (not illustrated) that is slidably attached to the seatbelt 5; and a buckle portion (not illustrated) that is fixed to the left side part of the vehicle seat 1 and fixes the anchor portion. When the seatbelt 5 is in use, the anchor portion is fixed to the buckle portion. Note that the upper right side with respect to the anchor portion is the shoulder belt 5A, and the right side with respect to the anchor portion is the lap belt 5B.

The airbag device according to the present embodiment is mounted on the vehicle seat 1 to protect an occupant seated in the vehicle seat 1 disposed in a vehicle. Specifically, the airbag device according to the present embodiment includes a first airbag group 8 and a second airbag group 9 that are disposed in the vehicle seat 1 in correspondence with impacts from two different directions and that respectively include a plurality of airbags.

The first airbag group 8 is installed in correspondence with an impact from a side direction of the vehicle. The first airbag group 8 includes a first side airbag 8A and a second side airbag 8B. The first side airbag 8A and the second side airbag 8B are stored in the seat back 3. In the airbag device according to the present embodiment, gas is supplied to the first side airbag 8A and the second side airbag 8B when the vehicle undergoes a side collision and impact occurs from the side direction of the vehicle, thus deploying the first side airbag 8A and the second side airbag 8B to protect the occupant. The first side airbag 8A is disposed on the right side of the seat back 3, and the second side airbag 8B is disposed on the left side of the seat back 3. Additionally, in the present embodiment, the vehicle seat 1 is disposed on the right side of the vehicle, and the first side airbag 8A is deployed between the waist of the occupant and the vehicle body side surface by the supply of gas to hold the waist of the occupant, thus suppressing the waist from colliding with the vehicle body side surface. On the other hand, the second side airbag 8B is deployed between the occupant seated in the vehicle seat 1 and the next occupant seated in the next vehicle seat installed on the left side of the vehicle seat 1 by the supply of gas, thus suppressing the head of the adjacent occupant from colliding with the occupant.

The second airbag group 9 is installed in correspondence with an impact from a front direction of the vehicle. The second airbag group 9 includes a seat airbag 9A and a seatbelt airbag 9B to protect the occupant against an impact from the front direction of the vehicle when the vehicle undergoes a front collision. The seat airbag 9A is stored in the seat cushion 2, and the seatbelt airbag 9B is stored in the lap belt 5B of the seatbelt 5. At least one of the plurality of airbags constituting the second airbag group 9 is disposed in the seat cushion 2. In the airbag device according to the present embodiment, gas is supplied to the seat airbag 9A and the seatbelt airbag 9B when the vehicle undergoes a front collision, thus deploying the seat airbag 9A and the seatbelt airbag 9B to protect the occupant. The seat airbag 9A is deployed within the seat cushion 2 by the supply of gas, thus lifting the thigh of the occupant and suppressing the buttocks region of the occupant from moving forward. As a result, the seat airbag 9A suppresses a submarine phenomenon in which the body of the occupant slides from the seat cushion 2 of the vehicle seat 1 and to underneath of the dashboard. The seatbelt airbag 9B is deployed from the chest of the occupant toward the front of the abdomen by the supply of gas to suppress the occupant from colliding with a structure or the like disposed in the front of the vehicle seat 1. Note that the seatbelt airbag 9B is stored within the shoulder belt 5A, and may suppress from the head to the chest of the occupant from colliding with the structure at the time of deployment.

The airbag device according to the present embodiment also includes a gas generator 10 that generates gas to be supplied to the first airbag group 8 or the second airbag group 9. The gas generator 10 is stored in the seat cushion 2. The gas generator 10 is an example of a gas generation unit, where the gas generation unit is constituted of one gas generator 10 in the present embodiment. The gas generator 10 is made of metal, and includes an igniter (not illustrated) and a gas generating agent (not illustrated) that is filled into a combustion chamber formed inside and is combusted by the igniter. The gas generator 10 generates gas by combusting the gas generating agent. The airbag device according to the present embodiment deploys each airbag by supplying gas generated by the gas generator 10 to the first airbag group 8 or the second airbag group 9. Note that the gas generator 10 may be a hybrid-type in which compressed air and gas generating agents are enclosed inside to supply compressed gas and combustion gas; or a stored-type consisting only of compressed gas.

Furthermore, the airbag device according to the present embodiment includes a pyro-type valve 11 that switches supply of gas to either the first airbag group 8 or the second airbag group 9. In the present embodiment, the pyro-type valve 11 is an example of a switching unit. The pyro-type valve 11 instantaneously obtains a large kinetic energy. The pyro-type valve 11 is operable only by the current for igniting an explosive, and operates with small power compared to an electromagnetic valve. Note that an electromagnetic valve may be used for the switching unit. Furthermore, a detailed configuration of the pyro-type valve 11 will be described later.

Furthermore, the airbag device according to the present embodiment includes a main gas path 12 connecting the gas generator 10 and the pyro-type valve 11, a first gas path 13 connecting the pyro-type valve 11 and the first airbag group 8, and a second gas path 14 connecting the pyro-type valve 11 and the second airbag group 9. The main gas path 12 is disposed in the seat cushion 2, and the first gas path 13 and the second gas path 14 are disposed inside across from the seat cushion 2 to the seat back 3. The gas supplied from the gas generator 10 moves through the main gas path 12 to the pyro-type valve 11. The pyro-type valve 11 can switch supply of gas to either the first airbag group 8 or the second airbag group 9. The gas is supplied to the first airbag group 8 through the first gas path 13, and the gas is supplied to the second airbag group 9 through the second gas path 14. The airbag device according to the present embodiment deploys the first side airbag 8A and the second side airbag 8B of the first airbag group 8 when an impact occurs from the side direction of the vehicle, and deploys the seat airbag 9A and the seatbelt airbag 9B of the second airbag group 9 when an impact occurs from the front direction of the vehicle. As a result, the airbag device can protect the occupant even when either the side collision or the front collision has occurred.

Next, a connection mode of the first airbag group 8 with respect to the first gas path 13 and a connection mode of the second airbag group 9 with respect to the second gas path 14 will be described. In the first gas path 13, the first side airbag 8A and the second side airbag 8B included in the first airbag group 8 are connected in series at different distances from the pyro-type valve 11. Note that the distance here is the distance along the first gas path 13. In the present embodiment, the first side airbag 8A and the second side airbag 8B are connected to the first gas path 13 in order from the one closer in distance along the first gas path 13, with respect to the pyro-type valve 11. Thus, the airbag device according to the present embodiment can first deploy the first side airbag 8A and then deploy the second side airbag 8B when an impact from the side direction (the right side direction in FIG. 1) occurs in the vehicle. The airbag device first deploys the first side airbag 8A to hold the waist of the occupant seated in the vehicle seat 1, and then deploys the second side airbag 8B to suppress the head of a next occupant from colliding with the occupant. This enables the airbag device according to the present embodiment to protect the occupant seated in the vehicle seat 1.

In the second gas path 14, the seat airbag 9A and the seatbelt airbag 9B included in the second airbag group 9 are connected in series at different distances from the pyro-type valve 11. Note that the distance here is the distance along the second gas path 14. In the present embodiment, the seat airbag 9A and the seatbelt airbag 9B are connected to the second gas path 14 in such an order from the one closer in distance along the second gas path 14 with respect to the pyro-type valve 11. Specifically, the second gas path 14 includes an upstream gas path 14A connecting the pyro-type valve 11 and the seat airbag 9A, and a downstream gas path 14B connecting the seat airbag 9A and the seatbelt airbag 9B. When gas is supplied to the second airbag group 9, gas is supplied to the seat airbag 9A through the upstream gas path 14A, and gas is supplied to the downstream gas path 14B via the seat airbag 9A. Then, gas is supplied from the downstream gas path 14B to the seatbelt airbag 9B. In the airbag device according to the present embodiment, the seat airbag 9A is first deployed and then the seatbelt airbag 9B is deployed when an impact from the front direction occurs in the vehicle. As a result, the airbag device causes the seat airbag 9A to be deployed before the seatbelt airbag 9B when an impact from the front direction occurs in the vehicle, thus securing the buttocks region of the occupant and suppressing the occupant from moving forward. Note that in the second airbag group 9, the seatbelt airbag 9B and the seat airbag 9A may be connected to the second gas path 14 in such an order from the one closer in distance with respect to the pyro-type valve 11. In this case, when an impact from the front direction occurs in the vehicle, the airbag device may deploy the seatbelt airbag 9B before the seat airbag 9A to hold from the chest to the abdomen of the occupant first.

Note that, the main gas path 12, the first gas path 13, and the second gas path 14 are formed of, for example, a predetermined metal, but may be formed of a flexible member such as rubber, or a frame pipe of the vehicle seat 1 may be used. Furthermore, the connecting portion of the seat cushion 2 and the seat back 3 in the first gas path 13 may be formed of a flexible member such as rubber, and even when the seat back 3 is inclined from the initial position, each gas path is prevented from breaking.

In addition, in the first airbag group 8, the first side airbag 8A is disposed on the side surface side of the vehicle body and thus is deployed in the occurrence side of the side collision, and the second side airbag 8B is deployed in the side opposite to the occurrence side. Furthermore, the total volume of the first side airbag 8A and the second side airbag 8B included in the first airbag group 8 is smaller than the total volume of the seat airbag 9A and the seatbelt airbag 9B included in the second airbag group 9. This is because between the spacing between the vehicle side surface and the occupant and the spacing between the occupant and the structure in front thereof, the spacing between vehicle side surface and the occupant is relatively narrower, and the first side airbag 8A deployed between the vehicle side surface and the occupant needs to be more quickly deployed than each airbag of the second airbag group 9. Since the volume of gas supplied from the gas generator 10 cannot be changed for the cases in which the first airbag group 8 is deployed and in which the second airbag group 9 is deployed, the total volume of the first airbag group 8 is made smaller than the total volume of the second airbag group 9, and thus the first side airbag 8A can be deployed in a shorter period of time than airbags of the second airbag group 9.

Furthermore, in the first gas path 13 connecting the first airbag group 8 which, in the first airbag group 8 and the second airbag group 9, has a smaller total volume, and the pyro-type valve 11, a valve 15 is disposed that communicates the inside of the path and the outside thereof when the inside of the path becomes greater than or equal to a predetermined pressure. An electromagnetic valve, for example, is used as the valve 15. The valve 15 is controlled and opened by a control circuit when a pressure sensor (not illustrated) disposed in the first gas path 13 detects that the pressure is greater than or equal to the predetermined pressure. The control circuit is, for example, an ECU 16 to be described later. In this case, the pressure sensor is electrically connected to the ECU 16. In a case where gas is supplied to either the first airbag group 8 or the second airbag group 9 with one gas generator 10, as with the present embodiment, the gas supply amount is set in the gas generator 10 in accordance with the second airbag group 9 having a larger total volume. Thus, when gas is supplied from the gas generator 10 to the first airbag group 8 having a smaller total volume, it is not preferable as load is applied to each airbag included in the first airbag group 8. Thus, the load on each airbag can be reduced by providing, on the first gas path 13, the valve 15 that discharges excessive gas to the outside when the inside of the path becomes greater than or equal to a predetermined pressure. Furthermore, instead of the valve 15, a weakened part that opens when the inside of the first gas path 13 becomes greater than or equal to a predetermined pressure may be formed in the first gas path 13.

Furthermore, in the airbag device according to the present embodiment, the first gas path 13 is formed with a larger cross-sectional area than the second gas path 14. Note that the cross-sectional area here is the area of the cross section in a direction orthogonal to the flow direction of the gas. The flow rate of gas per unit time can be increased as the cross-sectional area of the gas path becomes larger, and thus a large amount of gas can be supplied in a short period of time, and the airbag connected to the relevant gas path can be deployed in a relatively short period of time. In the present embodiment, by forming the first gas path 13 to have a larger cross-sectional area than the second gas path 14, when deploying the airbags, each airbag included in the first airbag group 8 can be deployed in a shorter period of time than each airbag included in the second airbag group 9.

Figure 2:
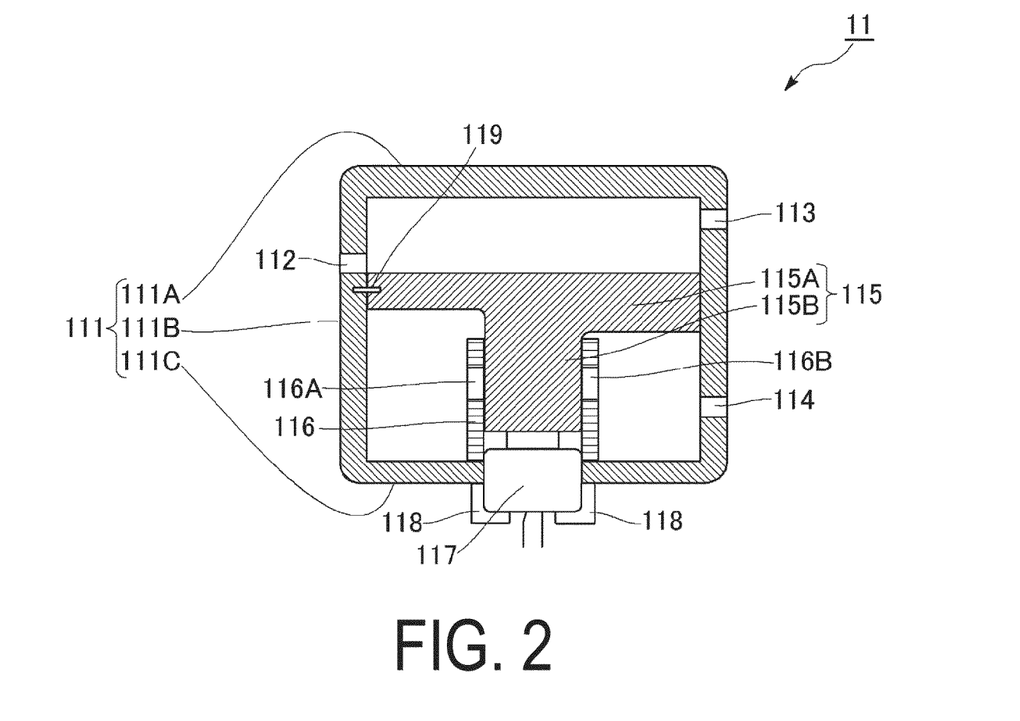
FIG. 2 is a cross-sectional view (1) of a pyro-type valve provided in the airbag device according to the first embodiment.
Figure 3:
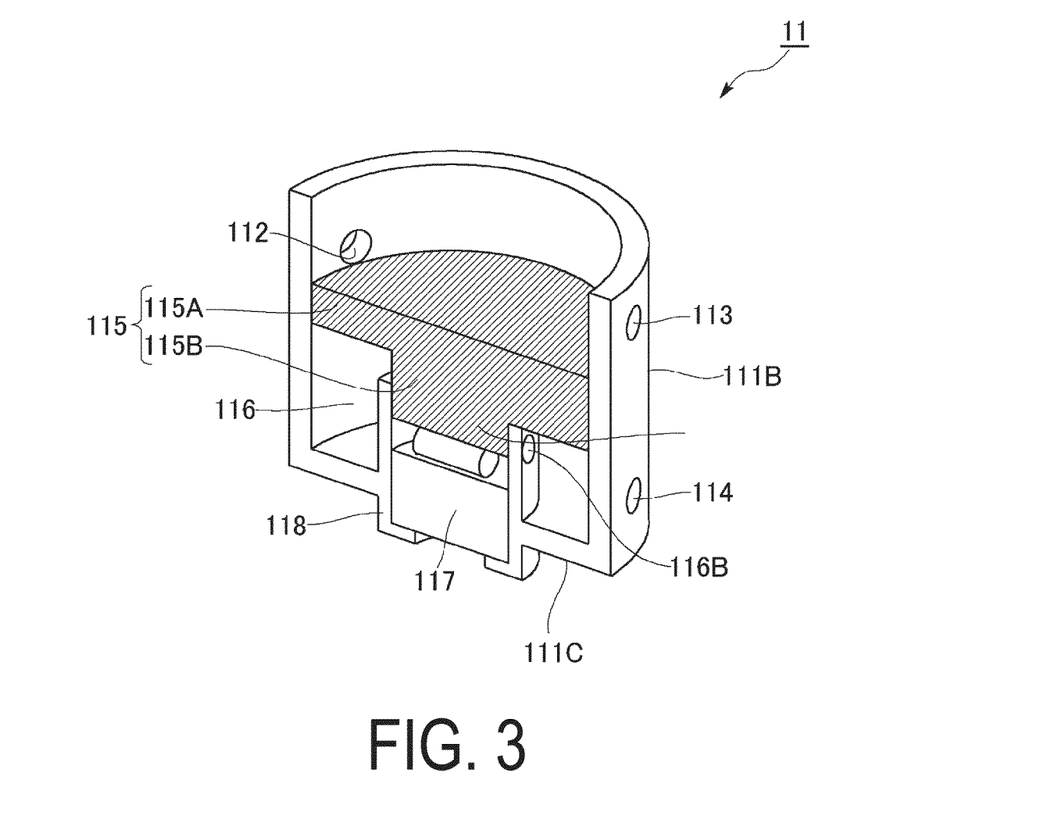
FIG. 3 is a cross-sectional view (2) of a pyro-type valve provided in the airbag device according to the first embodiment.
Figure 4:
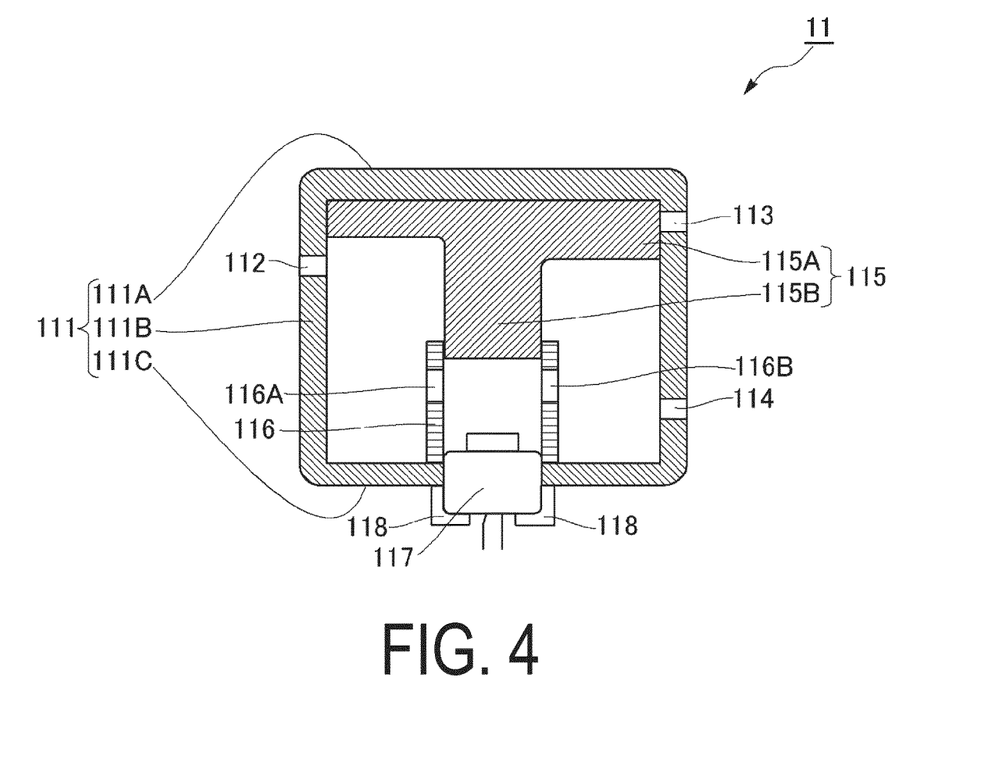
FIG. 4 is a cross-sectional view (3) of a pyro-type valve provided in the airbag device according to the first embodiment.

Next, the pyro-type valve 11 will be described with reference to FIGS. 2 to 4. FIGS. 2 to 4 are cross-sectional views taken along the axial direction of the pyro-type valve 11. FIGS. 2 and 3 illustrate the pyro-type valve 11 in a state in which gas is supplied to the first airbag group 8, and FIG. 4 illustrates the pyro-type valve 11 in a state in which gas is supplied to the second airbag group 9.

The pyro-type valve 11 has a cylinder 111 formed of metal and having a hollow columnar shape. The cylinder 111 has a tubular peripheral wall portion 111B, a top surface portion 111A that closes one end in an axial direction of the peripheral wall portion 111B, and a bottom surface portion 111C that blocks the other end in the axial direction of the peripheral wall portion 111B, and is formed with an interior space therein. Note that FIG. 3 is a perspective view illustrating a cross section of the pyro-type valve 11, and the illustration of the top surface portion 111A is omitted in order to illustrate the interior space of the cylinder 111. A gas inlet 112 is formed in the peripheral wall portion 111B. Furthermore, a first gas outlet 113 and a second gas outlet 114 are formed in the peripheral wall portion 111 on the opposite side to the gas inlet 112 with respect to the axis of the peripheral wall portion 111B. The first gas outlet 113 is formed on the top surface portion 111A side, and the second gas outlet 114 is formed on the bottom surface portion 111C side.

The main gas path 12 is connected to the gas inlet 112, and the gas supplied from the gas generator 10 is introduced into the interior space of the cylinder 111 via the gas inlet 112. The first gas path 13 is connected to the first gas outlet 113, and the upstream gas path 14A of the second gas path 14 is connected to the second gas outlet 114. When gas is supplied to the first airbag group 8, the gas is directed from the first gas outlet 113 toward the first gas path 13. When gas is supplied to the second airbag group 9, the gas moves from the second gas outlet 114 toward the second gas path 14.

The pyro-type valve 11 has a piston 115 formed of metal and movable in its axial direction within the interior space of the cylinder 111. The piston 115 has an enlarged diameter portion 115A disposed on the top surface portion 111A side and having a diameter slightly smaller than an inner diameter of the peripheral wall portion 111B, and a reduced diameter portion 115B disposed on the bottom surface portion 111C side and having a diameter smaller than the enlarged diameter portion 115A. Furthermore, the pyro-type valve 11 has a tubular inner tube member 116 disposed in the interior space of the cylinder 111 and fixed to the bottom surface portion 111C by welding. Each central axis of the inner tube member 116 and the cylinder 111 is aligned, and the reduced diameter portion 115B of the piston 115 is disposed in the inner tube member 116. The inner diameter of the inner tube member 116 is slightly larger than the diameter of the reduced diameter portion 115B, and thus the reduced diameter portion 115B is movable within the inner tube member 116 in the axial direction of the cylinder 111. Furthermore, communication holes 116A, 116B are formed in the inner tube member 116. The communication holes 116A, 116B are provided to form a flow path of gas from the gas inlet 112 to the second gas outlet 114 in the state illustrated in FIG. 4.

Furthermore, an opening is formed on the bottom surface portion 111C side of the inner tube member 116 in the pyro-type valve 11, and the igniter 117 is fitted into the opening. The pyro-type valve 11 fixes the igniter 117 by caulking the metal fixing portion 118 welded to the bottom surface portion 111C against the igniter 117.

The pyro-type valve 11 is disposed in the seat cushion 2 shown in FIG. 1 such that the piston 115 moves horizontally. As illustrated in FIG. 2, the pyro-type valve 11 has the piston 115 fixed to the peripheral wall portion 111B by a shear pin 119 made of resin before the operation. In a state before the operation shown in FIGS. 2 and 3 of the pyro-type valve 11, the reduced diameter portion 115B is stationary at the position abutting the igniter 117, the path from the gas inlet 112 to the second gas outlet 114 is blocked by the enlarged diameter portion 115A, and the gas flow path through which the gas moves from the gas inlet 112 to the first gas outlet 113 is formed. In addition, in a state before operation of the pyro-type valve 11, the communication holes 116A, 116B are closed by the reduced diameter portion 115B of the piston 115.

When the ignition current flows to the igniter 117, the igniter 117 is operated, thus generating shockwaves toward the top surface portion 111A side in the axial direction of the cylinder 111. This moves the piston 115 toward the top surface portion 111A side. FIG. 4 illustrates a state after operation of the pyro-type valve 11. In a state after the operation shown in FIG. 4 of the pyro-type valve 11, the enlarged diameter portion 115A is stationary at the position abutting the top surface portion 111A, the first gas outlet 113 is closed by the enlarged diameter portion 115A, and the gas flow path through which the gas moves from the gas inlet 112 to the second gas outlet 114 via the communication holes 116A, 116B is formed.

In this way, the pyro-type valve 11 can introduce the gas from the gas generator 10 to either one of the first gas path 13 or the second gas path 14 by moving the piston 115 by the igniter 117. Note that when the pyro-type valve 11 is operated, a fixing means of the piston may be provided such that the piston 115 does not reverse from the state in FIG. 4 to the state in FIG. 2.

Furthermore, as illustrated in FIG. 1, each igniter of the gas generator 10 and the pyro-type valve 11 of the airbag device according to the present embodiment is electrically connected to an Electronic Control Unit (ECU) 16 for the airbag device control. The ECU 16 is electrically connected to a sensor 17 that is mounted on the vehicle to detect a front collision and a sensor 18 that is mounted on the vehicle to detect a side collision. The ECU 16 transmits a control signal to the airbag device when the sensor 17 detects a side collision or when the sensor 18 detects a front collision. This control signal is specifically the ignition current for each igniter of the gas generator 10 and the pyro-type valve 11. The airbag device according to the present embodiment operates the gas generator 10 to supply gas to the first airbag group 8 at the time of a side collision, and operates the gas generator 10 and the pyro-type valve 11 to supply gas to the second airbag group 9 at the time of a front collision based on the control signal from the ECU 16. As a result, the airbag device can protect the occupant both at the time of a side collision and at the time of a front collision. Note that the sensors 17, 18 may be a pre-crush sensor or the like that predicts a collision of a vehicle, in which case, a configuration in which the first airbag group 8 or the second airbag group 9 is deployed before an actual collision occurs may be adopted.

Thus, the airbag device according to the present embodiment includes a first airbag group 8 and a second airbag group 9 disposed in the vehicle seat 1, and a gas generator 10 and a pyro-type valve 11 disposed in the seat cushion 2. The airbag device makes it possible for the seat back 3 to be made thinner by providing, in the seat back 3, the first side airbag 8A and the second side airbag 8B, whose bulk can be reduced by folding, and having the gas generator 10 and the pyro-type valve 11 disposed in the seat cushion 2. In addition, even when the occupant seated in a vehicle seat behind the vehicle seat 1 moves forward by inertial force and collides with the seat back 3 at the time of a front collision of the vehicle, the degree of damage of the occupant can be minimized as the gas generator 10 and the pyro-type valve 11 made of relatively hard metal are not disposed in the seat back 3. Furthermore, the airbag device according to the present embodiment merely needs to deploy the airbag necessary for occupant protection according to the direction of impact, and therefore, each airbag merely needs to have a volume of an extent that can protect the occupant from an impact in one direction, and the volume of each airbag can be reduced. Furthermore, the airbag device protects the required protecting portion with an independent airbag, and thus the volume of each airbag can be reduced. Thus, the amount of gas necessary for deployment of the airbag can be reduced, and the gas generator 10 can be miniaturized. Thus, the airbag device makes it possible for the vehicle seat 1 on which each airbag and the gas generator 10 are mounted to be made thinner. The airbag device according to the present embodiment can protect the occupant while making the vehicle seat 1 thinner.

Second Embodiment

Figure 5:
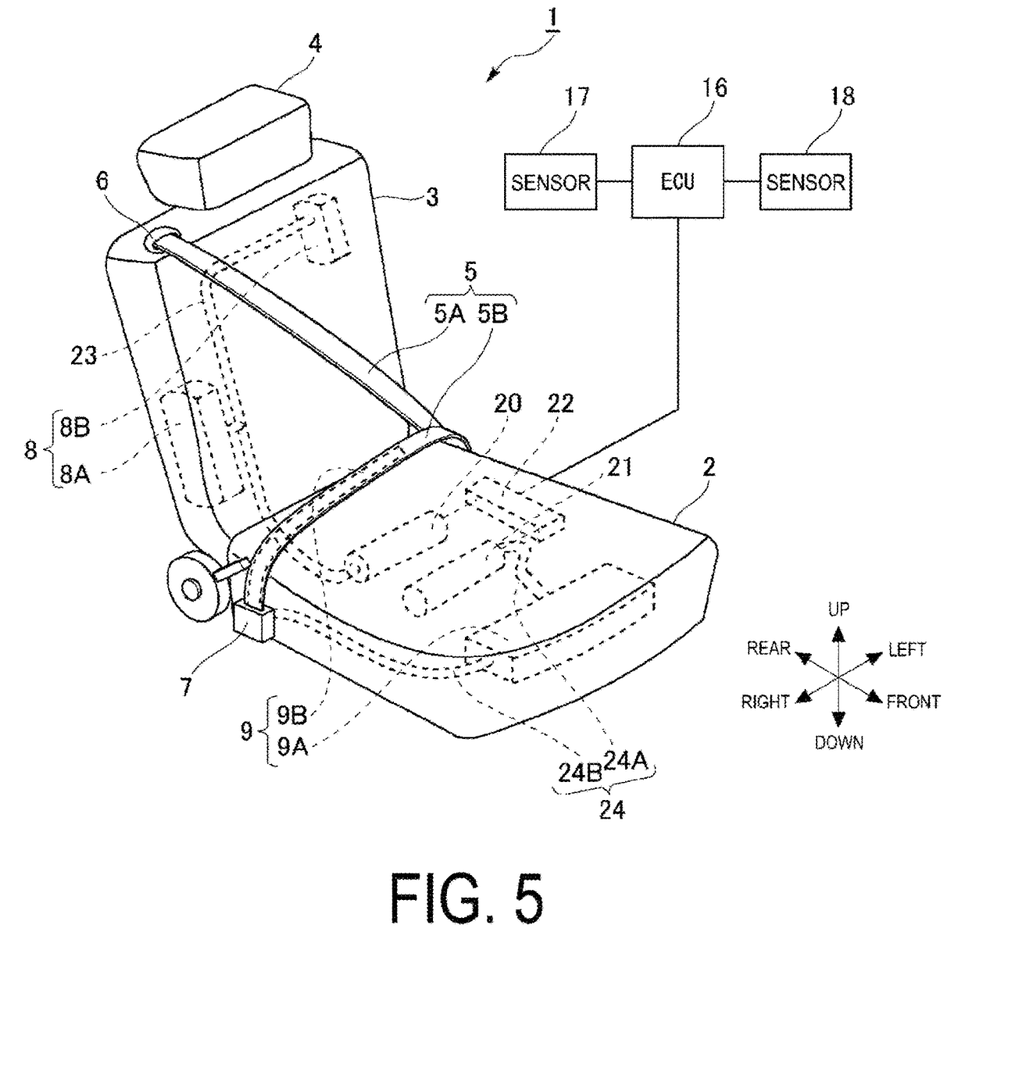
FIG. 5 is an outer appearance perspective view of a vehicle seat on which an airbag device according to a second embodiment is disposed.

Next, an airbag device according to a second embodiment will be described with reference to FIG. 5. FIG. 5 is an outer appearance perspective view of a vehicle seat 1 on which an airbag device according to the present embodiment is mounted. In FIG. 5, the same reference characters are denoted to the configurations substantially the same as those in the first embodiment described above, and explanation thereof is omitted.

The airbag device according to the present embodiment includes a first gas generator 20 and a second gas generator 21. In the present embodiment, the gas generation unit is configured to include the first gas generator 20 and the second gas generator 21. The first gas generator 20 is provided to supply gas to the first airbag group 8. The second gas generator 21 is provided to supply gas to the second airbag group 9. The first gas generator 20 and the second gas generator 21 are disposed in the seat cushion 2. Note that for the first gas generator 20 and the second gas generator 21, one similar to the gas generator 10 according to the first embodiment described above can be used.

Furthermore, the airbag device according to the present embodiment includes a control unit 22 that independently operates the first gas generator 20 or the second gas generator 21 based on information indicating that an impact from either direction of the side direction or the front direction has been received. The control unit 22 is disposed in the seat cushion 2, and is electrically connected to the ECU 16 and each igniter of the first gas generator 20 and the second gas generator 21. In the present embodiment, the control unit 22 is an example of a switching unit.

Furthermore, the airbag device according to the present embodiment includes a first gas path 23 connecting the first gas generator 20 and the first airbag group 8, and a second gas path 24 connecting the second gas generator 21 and the second airbag group 9. In the first gas path 23, the first side airbag 8A and the second side airbag 8B included in the first airbag group 8 are connected in series at different distances from the first gas generator 20. Note that the distance here is the distance along the first gas path 23. The first side airbag 8A and the second side airbag 8B are connected to the first gas path 23 in such an order from the one closer in distance along the first gas path 23 with respect to the first gas generator 20. Thus, in the same manner as in the first embodiment, the airbag device according to the present embodiment can first deploy the first side airbag 8A and then deploy the second side airbag 8B when an impact from the side direction occurs in the vehicle.

Furthermore, in the second gas path 24, the seat airbag 9A and the seatbelt airbag 9B included in the second airbag group 9 are connected in series at different distances from the second gas generator 21. Note that the distance here is the distance along the second gas path 24. In the present embodiment, the seat airbag 9A and the seatbelt airbag 9B are connected to the second gas path 14 in such an order from the one closer to the second gas generator 21. Specifically, the second gas path 24 includes an upstream gas path 24A connecting the second gas generator 21 and the seat airbag 9A, and a downstream gas path 24B connecting the seat airbag 9A and the seatbelt airbag 9B. When gas is supplied to the second airbag group 9, gas is supplied to the seat airbag 9A through the upstream gas path 24A, and gas is supplied to the downstream gas path 24B via the seat airbag 9A. Then, gas is supplied from the downstream gas path 24B to the seatbelt airbag 9B. In the same manner as in the airbag device according to the first embodiment, the airbag device according to the present embodiment first deploys the seat airbag 9A and then deploys the seatbelt airbag 9B when the vehicle undergoes a front collision.

Note that, the first gas path 23 and the second gas path 24 are formed of, for example, a predetermined metal, but may be formed of a flexible member such as rubber, or a frame pipe of the vehicle seat 1 may be used. Furthermore, the connecting portion of the seat cushion 2 and the seat back 3 in the first gas path 23 may be formed of a flexible member such as rubber, and even when the seat back 3 is inclined from the initial position, each gas path is prevented from breaking.

Furthermore, in the airbag device according to the present embodiment, the first gas path 23 is formed with a larger cross-sectional area than the second gas path 24. Note that the cross-sectional area here is the area of the cross section in a direction orthogonal to the flow direction of the gas. In the airbag device, by forming the first gas path 23 to have a larger cross-sectional area than the second gas path 24, each airbag included in the first airbag group 8 can be deployed in a shorter period of time than each airbag included in the second airbag group 9.

The ECU 16 determines that the vehicle has been subjected to impact from the side direction or the front direction or from both of these directions based on the detection signal from the sensors 17, 18, and transmits to the control unit 22 information indicating that the vehicle has been subjected to impact from the side direction or the front direction or from both of these directions. The control unit 22 can operate either one or both of the first gas generator 20 or the second gas generator 21 based on the information. For example, when the ECU 16 determines that the vehicle has received an impact from the side direction and the control unit 22 receives such information, the control unit 22 operates the first gas generator 20 to deploy each airbag of the first airbag group 8. In addition, when the ECU 16 determines that the vehicle has received an impact from the front direction and the control unit 22 receives such information, the control unit 22 operates the second gas generator 21 to deploy each airbag of the second airbag group 9. Furthermore, when the ECU 16 determines that the vehicle has received an impact from both the side direction and the front direction and the control unit 22 receives such information, the control unit 22 operates the first gas generator 20 and the second gas generator 21 to deploy both the airbags of the first airbag group 8 and the airbags of the second airbag group 9. Note that the operation timing of the first gas generator 20 and the second gas generator 21 may be determined depending on whether to simultaneously deploy the first airbag group 8 and the second airbag group 9 or to deploy one of the airbag groups first, or the operation timing of the gas generator that supplies gas to the airbag group may be determined based on the deployment timing of the airbag group to be deployed later.

Thus, for example, the airbag device according to the present embodiment can deploy both the first airbag group 8 and the second airbag group 9 when, for example, the vehicle undergoes multiple collisions and is subjected to impact from both the side direction and the front direction. As a result, the airbag device can protect the occupant even when the vehicle is subjected to impact from both the side direction and the front direction.

Moreover, the airbag device according to the present embodiment includes the first airbag group 8 and the second airbag group 9 disposed in the vehicle seat 1, and the first gas generator 20, the second gas generator 21, and the control unit 22 disposed in the seat cushion 2. The airbag device makes it possible for the seat back 3 to be made thinner by providing, in the seat back 3, the first side airbag 8A and the second side airbag 8B, whose bulk can be reduced by folding, and having the first gas generator 20, the second gas generator 21, and the control unit 22 disposed in the seat cushion 2. As described above, the airbag device according to the present embodiment can protect the occupant while making the vehicle seat 1 thinner.

OTHER EXAMPLES

The embodiments according to the present invention have been described, but various embodiments described above can be combined as much as possible. Furthermore, the total volume of the plurality of airbags included in the second airbag group 9 may be made smaller than the total volume of the plurality of airbags included in the first airbag group 8, may be reduced. In this case, the valve 15 may be disposed in the second gas path 14, and the second gas paths 14, 24 may be formed to have a larger cross-sectional area than the first gas paths 13, 23.

Each aspect disclosed in the present specification can be combined with any other feature disclosed herein.

REFERENCE SIGNS LIST

1 Vehicle seat
2 Seat cushion
3 Seat back
4 Headrest
5 Seatbelt
6 Retractor
7 Fixing portion
8 First airbag group
9 Second airbag group
10 Gas generator
11 Pyro-type valve
12 Main gas path
13 First gas path
14 Second gas path
15 Valve
16 ECU
17 Sensor
18 Sensor
20 First gas generator
21 Second gas generator
22 Control unit
23 First gas path
24 Second gas path
111 Cylinder
112 Gas inlet
113 First gas outlet
114 Second gas outlet
115 Piston
116 Inner tube member
117 Igniter
118 Fixing portion

The invention claimed is:

1. An airbag device that protects an occupant seated in a vehicle seat disposed in a vehicle, the airbag device comprising:
    a first airbag group and a second airbag group disposed in the vehicle seat in correspondence with impacts from two different directions, the first airbag group and the second airbag group each including a plurality of airbags;
    a gas generation unit disposed in a seat cushion, of the vehicle seat, that supports a buttocks region of the occupant, the gas generation unit generating a gas to be supplied to the first airbag group or the second airbag group; and
    a switching unit that switches supply of the gas to either the first airbag group or the second airbag group.

2. The airbag device according to claim 1, wherein
    the first airbag group is disposed in a seat back, of the vehicle seat, that supports the back of the occupant, and
    at least one of the plurality of airbags constituting the second airbag group is disposed in the seat cushion.

3. The airbag device according to claim 1, wherein
    the gas generation unit is constituted of one gas generator;
    the airbag device further includes,
    a main gas path connecting the gas generation unit and the switching unit,
    a first gas path connecting the switching unit and the first airbag group, and
    a second gas path connecting the switching unit and the second airbag group; and
    the plurality of airbags included in either one of the first airbag group or the second airbag group are connected to at least either one of the first gas path or the second gas path, in series at different distances from the switching unit.

4. The airbag device according to claim 3, wherein the switching unit is a pyro-type valve disposed in the seat cushion.

5. The airbag device according to claim 3, wherein
the plurality of airbags included in the first airbag group and the plurality of airbags included in the second airbag group differ in total volume, and
a valve is disposed in the first gas path or the second gas path connecting one of the first airbag group and the second airbag group, having a smaller total volume, and the switching unit, the valve communicating an inside of the path and an outside thereof when the inside of the path becomes greater than or equal to a predetermined pressure.

6. The airbag device according to claim 5, wherein
an impact from one direction, of the impacts from the two directions, occurs due to a side collision of the vehicle,
the first airbag group includes a first side airbag that deploys in an occurrence side of the side collision, and a second side airbag that deploys in a side opposite to the occurrence side,
the first airbag group has a smaller total volume than the second airbag group, and
the first gas path has a larger cross-sectional area than the second gas path.

7. The airbag device according to claim 1, wherein
the gas generation unit is configured to include a first gas generator and a second gas generator,
the switching unit is a control unit configured to independently operate the first gas generator or the second gas generator based on information indicating that impact from either one of the two directions has been received,
the airbag device further includes
a first gas path connecting the first gas generator and the first airbag group, and
a second gas path connecting the second gas generator and the second airbag group, and
the plurality of airbags included in either one of the first airbag group or the second airbag group are connected to at least one of the first gas path or the second gas path, in series at different distances from the first gas generator or the second gas generator.

8. The airbag device according to claim 7, wherein
an impact from one direction, of the impacts from the two directions, occurs due to a side collision of the vehicle,
the first airbag group includes a first side airbag that deploys in an occurrence side of the side collision, and a second side airbag that deploys in a side opposite to the occurrence side,
a total volume of the plurality of airbags included in the first airbag group is smaller than a total volume of the plurality of airbags included in the second airbag group,
the first gas path has a larger cross-sectional area than the second gas path, and
a volume of the gas to be generated is smaller in the first gas generator than in the second gas generator.

9. The airbag device according to claim 2, wherein
the gas generation unit is constituted of one gas generator;
the airbag device further includes,
a main gas path connecting the gas generation unit and the switching unit,
a first gas path connecting the switching unit and the first airbag group, and
a second gas path connecting the switching unit and the second airbag group; and
the plurality of airbags included in either one of the first airbag group or the second airbag group are connected to at least either one of the first gas path or the second gas path, in series at different distances from the switching unit.

10. The airbag device according to claim 9, wherein
the gas generation unit is constituted of one gas generator;
the airbag device further includes,
a main gas path connecting the gas generation unit and the switching unit,
a first gas path connecting the switching unit and the first airbag group, and
a second gas path connecting the switching unit and the second airbag group; and
the plurality of airbags included in either one of the first airbag group or the second airbag group are connected to at least either one of the first gas path or the second gas path, in series at different distances from the switching unit.

11. The airbag device according to claim 10, wherein the switching unit is a pyro-type valve disposed in the seat cushion.

12. The airbag device according to claim 11, wherein
the plurality of airbags included in the first airbag group and the plurality of airbags included in the second airbag group differ in total volume, and
a valve is disposed in the first gas path or the second gas path connecting one of the first airbag group and the second airbag group, having a smaller total volume, and the switching unit, the valve communicating an inside of the path and an outside thereof when the inside of the path becomes greater than or equal to a predetermined pressure.

13. The airbag device according to claim 12, wherein
an impact from one direction, of the impacts from the two directions, occurs due to a side collision of the vehicle,
the first airbag group includes a first side airbag that deploys in an occurrence side of the side collision, and a second side airbag that deploys in a side opposite to the occurrence side,
the first airbag group has a smaller total volume than the second airbag group, and
the first gas path has a larger cross-sectional area than the second gas path.

14. The airbag device according to claim 2, wherein
the gas generation unit is configured to include a first gas generator and a second gas generator,
the switching unit is a control unit configured to independently operate the first gas generator or the second gas generator based on information indicating that impact from either one of the two directions has been received,
the airbag device further includes
a first gas path connecting the first gas generator and the first airbag group, and
a second gas path connecting the second gas generator and the second airbag group, and
the plurality of airbags included in either one of the first airbag group or the second airbag group are connected to at least one of the first gas path or the second gas path, in series at different distances from the first gas generator or the second gas generator.

15. The airbag device according to claim 14, wherein
an impact from one direction, of the impacts from the two directions, occurs due to a side collision of the vehicle,
the first airbag group includes a first side airbag that deploys in an occurrence side of the side collision, and a second side airbag that deploys in a side opposite to the occurrence side, a total volume of the plurality of airbags included in the first airbag group is smaller than a total volume of the plurality of airbags included in the second airbag group, the first gas path has a larger cross-sectional area than the second gas path, and a volume of the gas to be generated is smaller in the first gas generator than in the second gas generator.

* * * * *